United States Patent [19]

Edmonds, Jr.

[11] 4,064,114
[45] Dec. 20, 1977

[54] PRODUCTION OF ARYLENE SULFIDE POLYMERS

[75] Inventor: James T. Edmonds, Jr., Bartlesville, Okla.

[73] Assignee: Phillips Petroleum Company, Bartlesville, Okla.

[21] Appl. No.: 642,098

[22] Filed: Jan. 19, 1976

Related U.S. Application Data

[63] Continuation-in-part of Ser. No. 581,331, May 27, 1975, abandoned.

[51] Int. Cl.$^2$ ............................................. C08G 75/16
[52] U.S. Cl. ................................. 260/79.1; 260/79
[58] Field of Search ................................. 260/79, 79.1

[56] References Cited

U.S. PATENT DOCUMENTS

| | | | |
|---|---|---|---|
| 3,354,129 | 11/1967 | Edmonds, Jr. et al. | 260/79 |
| 3,562,199 | 2/1971 | Hill, Jr. et al | 260/79.1 |
| 3,607,843 | 9/1971 | Vidaurri, Jr. | 260/79 |
| 3,763,124 | 10/1973 | Edmonds, Jr. | 260/79.1 |
| 3,786,035 | 1/1974 | Scoggin | 260/79.1 |
| 3,876,591 | 4/1975 | Campbell | 260/79.1 |
| 3,898,204 | 8/1975 | Short et al. | 260/79 |
| 3,919,177 | 11/1975 | Campbell | 260/79.1 |

*Primary Examiner*—Melvyn I. Marquis

[57] ABSTRACT

A method is provided for producing arylene sulfide polymers employing a p-dihalobenzene, an alkali metal sulfide, lithium acetate, an N-alkyl-2-pyrrolidone, and optionally a polyhalo aromatic compound having more than two halogen substituents per molecule, preferably with the addition of a base selected from alkali metal hydroxides and alkali metal carbonates at polymerization conditions. A first composition comprising N-alkyl-2-pyrrolidone, lithium acetate and water is prepared and subjected to dehydration conditions after which a composition containing at least 50 weight percent water, an alkali metal sulfide and preferably containing a base is added to the first dehydrated composition and a second dehydration performed. A composition resulting from the second dehydration is then contacted with a p-dihalobenzene, and optionally a polyhalo aromatic compound having more than two halogen substituents per molecule, at polymerization conditions to form arylene sulfide polymers of higher molecular weight than produced without the two-step dehydration. The two-step dehydration also results in less foaming and flooding of the distillation column as compared with the process using a single dehydration.

26 Claims, No Drawings

PRODUCTION OF ARYLENE SULFIDE POLYMERS

This is a continuation-in-part application of my co-pending application having Ser. No. 581,331, filed May 27, 1975 and now abandoned.

BACKGROUND OF THE INVENTION

This invention relates to the production of arylene sulfide polymers. In one of its aspects this invention relates to a novel method for producing novel arylene sulfide polymers, and to the polymers themselves. In another of its aspects this invention relates to producing arylene sulfide polymers of higher molecular weight than are produced without using a multiple dehydration method with the same starting materials.

The preparation of arylene sulfide polymers having higher molecular weight as evidenced by lower melt flow without curing the polymers as compared to arylene sulfide polymers known in the art is of particular interest since lower melt flows, particularly within the range of 1 to 700 as determined by the method of ASTM D 1238-70, are particularly useful in the production of fibers, molded objects and filaments since the usual curing step is obviated.

In the production of an arylene sulfide polymer by employing a p-dihalobenzene, an alkali metal sulfide, lithium acetate, an N-alkyl-2-pyrrolidone, and optionally a polyhalo aromatic compound having more than two halogen substituents per molecule, the lithium acetate is generally used as the dihydrate, and the alkali metal sulfide is generally employed as a hydrate and/or in admixture with free water. For example, it is convenient to use the alkali metal sulfide in the form of a composition comprising about 45 to about 50 weight percent sodium sulfide, expressed as $Na_2S$, this composition being prepared from aqueous sodium hydroxide and aqueous sodium bisulfide, both commercially available. However, it is preferable that water be removed from both the lithium acetate dihydrate and the alkali metal sulfide in hydrated form and/or in admixture with free water prior to contacting the p-dihalobenzene and the polyhalo aromatic compound having more than two halogen substituents per molecule, if used, with the other ingredients employed in the production of the polymer. Although water can be removed from a mixture of the lithium acetate dihydrate and the alkali metal sulfide in hydrated form and/or in admixture with free water, in an N-alkyl-2-pyrrolidone, by distillation in a one-step dehydration, the present invention utilizes a two-step dehydration process which provides the advantages of producing polymers of lower melt flow than are produced when a single step dehydration is employed.

It is therefore an object of this invention to produce arylene sulfide polymers of increased molecular weight as compared to those produced by prior art methods.

Other aspects, objects and the various advantages of this invention will become apparent upon reading this specification and the appended claims.

STATEMENT OF THE INVENTION

In accordance with this invention, in the production of an arylene sulfide polymer by employing (1) a p-dihalobenzene and optionally a polyhalo aromatic compound having more than two halogen substituents per molecule, (2) a composition containing at least about 50 weight percent water and an alkali metal sulfide, a base selected from alkali metal hydroxides and alkali metal carbonates preferably being present, (3) lithium acetate as the dihydrate or as an aqueous solution or slurry, and (4) an N-alkyl-2-pyrrolidone, dehydration by distillation of water is first conducted on a mixture of (3) and (4), after which (2) is added to the residual mixture, and another dehydration by distillation of water is conducted on the resulting mixture, followed by addition of the p-dihalobenzene prior to the polymerization step. The polyhalo aromatic compound having more than two halogen substituents per molecule, if used, can be added at substantially the same time as the p-dihalobenzene or can be added incrementally or all at once during the course of the polymerization, after polymerization of the p-dihalobenzene has begun. The two-step dehydration, as compared with a single dehydration of a mixture of (2), (3), and (4), results in less foaming and flooding in the distillation column and results in an arylene sulfide polymer of higher molecular weight, as evidenced by lower melt flow and higher inherent viscosity. When (1) includes both a p-dihalobenzene and a polyhalo aromatic compound having more than two halogen substituents per molecule, the polymer produced is a branched arylene sulfide polymer. When a polyhalo aromatic compound having more than two halogen substituents is not employed, the polymer produced is a linear p-phenylene sulfide polymer, i.e., a linear arylene sulfide polymer.

p-Dihalobenzenes which can be employed in the process of this invention can be represented by the formula

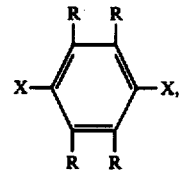

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhalo aromatic compounds having more than two halogen substituents per molecule which optionally can be employed in the process of this invention can be represented by the formula $R'''X_n$, where each X is selected from the group consisting of chlorine, bromine, and iodine, n is an integer of 3 to 6, and $R'''$ is a polyvalent aromatic radical of valence n which can have up to about 4 methyl substituents, the total number of carbon atoms in R''' being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2-dibromo-4-iodobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like and mixtures thereof.

Alkali metal sulfides which can be employed in the process of this invention include lithium sulfide, sodium sulfide, potassium sulfide, rubidium sulfide, cesium sulfide, and mixtures thereof. The alkali metal sulfide can be used in hydrated form and/or as an aqueous mixture. If desired, the composition comprising the alkali metal sulfide can be produced by mixing aqueous alkali metal bisulfide, e.g., aqueous sodium bisulfide, and aqueous alkali metal hydroxide, e.g., aqueous sodium hdyroxide.

As stated previously, the composition comprising the alkali metal sulfide preferably also contains a base selected from alkali metal hydroxides and alkali metal carbonates. Examples of some bases which can be employed include lithium hydroxide, sodium hydroxide, potassium hydroxide, rubidium hydroxide, cesium hydroxide, lithium carbonate, sodium carbonate, potassium carbonate, rubidium carbonate, cesium carbonate, and mixtures thereof.

N-Alkyl-2-pyrrolidones which can be employed in the process of this invention can be represented by the formula

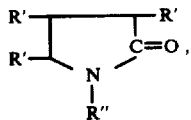

where each R' is selected from the group consisting of hydrogen and R'', and R'' is an alkyl radical having 1 to about 3 carbon atoms, the total number of carbon atoms in each molecule of the N-alkyl-2-pyrrolidone being 5 to about 8.

Examples of some N-alkyl-2-pyrrolidones which can be employed in the process of this invention include N-methyl-2-pyrrolidone, N-ethyl-2-pyrrolidone, N-propyl-2-pyrrolidone, N-isopropyl-2-pyrrolidone, N-3,4,5-tetramethyl-2-pyrrolidone, N,3-dimethyl-5-ethyl-2-pyrrolidone, N-methyl-3-propyl-2-pyrrolidone, N-methyl-4-isopropyl-2-pyrrolidone, and the like, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1. The amount of polyhalo aromatic compound having more than two halogen substituents per molecule, if used, can vary considerably, depending in part on the halogen content of said polyhalo aromatic compound, but generally will be up to about 0.6 part by weight, preferably being about 0.1 part by weight to about 0.4 part by weight, per 100 parts by weight p-dihalobenzene. The mole ratio of lithium acetate to alkali metal sulfide can vary over a wide range but generally will be within the range of about 0.7:1 to about 4:1, usually about 0.9:1 to about 1.5:1. When a base selected from alkali metal hydroxides and alkali metal carbonates is employed, the mole ratio of said base to alkali metal sulfide, excluding any base consumed in the conversion of alkali metal bisulfide, if used, to alkali metal sulfide, can vary greatly but generally will be an amount up to about 0.8:1, preferably being an amount within the range of about 0.01:1 to about 0.6:1. The amount of N-alkyl-2-pyrrolidone present during the dehydrations can vary greatly, generally being within the range of about 200 grams to about 1,000 grams, preferably about 300 grams to about 800 grams, per gram-mole of alkali metal sulfide used in the polymerization reaction. If desired, an additional amount of N-alkyl-2-pyrrolidone, e.g., an amount up to about 1,000 grams per gram-mole of alkali metal sulfide employed, can be added after the dehydration steps but prior to the polymerization step.

Although the reaction temperature at which the polymerization is conducted can vary over a wide range, generally it will be within the range of about 125° C to about 450° C, preferably about 175° C to about 350° C. The reaction time can vary widely, depending in part on the reaction temperature, but generally will be within the range of about 10 minutes to about 72 hours, preferably about 1 hour to about 8 hours. The pressure should be sufficient to maintain the p-dihalobenzene, the polyhalo aromatic compound having more than two halogen substituents per molecule, if used, and the organic amide substantially in the liquid phase.

The arylene sulfide polymers produced by the process of this invention can be separated from the reaction mixture by conventional procedures, e.g., by filtration of the polymer, followed by washing with water or by dilution of the reaction mixture with water, followed by filtration and water washing of the polymer. Alternatively, N-alkyl-2-pyrrolidone can be recovered by distillation from the reaction mixture prior to washing with water. When this latter procedure is employed, and there is charged to the polymerization reactor an amount of an alkali metal hydroxide greater than that required to convert alkali metal bisulfide, if used, to alkali metal sulfide, and the N-alkyl-2-pyrrolidone is distilled at elevated temperatures, e.g., about 200° C, it is preferable that carbon dioxide be added during the polymerization reaction or upon completion of the polymerization reaction, but prior to distillation of the N-alkyl-2-pyrrolidone, to inhibit decomposition of the arylene sulfide polymer during distillation of the N-alkyl-2-pyrrolidone.

The arylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers. Those arylene sulfide polymers having a relatively low melt flow, e.g., within the range of about 50 to about 700 (determined by the method of ASTM D 1238-70, modified to a temperature of about 316° C using a 5kg weight, the value being expressed as g/10 min.), are particularly useful in the production of fibers, molded objects, and films since the usual curing step is obviated.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution.

EXAMPLE I

In a control run, with dehydration of charged ingredients in a single step, poly(p-phenylene sulfide) was produced in a process outside the scope of this invention, using water in free form and as water of hydration of sodium sulfide in a total amount approximately equal to that which would be used in a commercial operation employing aqueous sodium sulfide produced from commercially available aqueous sodium bisulfide and aqueous sodium hydroxide. Thus 983.7 g (60 percent assay, 7.56 moles) sodium sulfide, 46.8 g (1.17 moles) sodium hydroxide, 765 g (7.50 moles) lithium acetate dihydrate, 384.9 g deionized water, and 3000 ml (3078 g) N-methyl-2-pyrrolidone were charged to a stirred 2 gallon reactor, which was then flushed with nitrogen. The mixture was then dehydrated by supplying heat, throughout the dehydration step, from two voltage regulated electric heaters connected to a 220 volt source. When the mixture attained a temperature of 265° F (129° C), refluxing began and it was necessary to use water cooling of the reactor to reduce foaming and flooding in the distillation column. The most vigorous foaming and flooding was over when the pot temperature reached 290° F (143° C), at which time 200 ml of distillate had been obtained. However, water cooling was continued, and some flooding continued until the pot temperature reached 310° F (154° C), at which time 450 ml of distillate had been reached. At this point, water cooling was discontinued, and distillation was continued until the pot temperature reached 405° F (207° C) and the distillation temperature reached 183° C. The total distillate, comprising primarily water, had a volume of 1,000 ml. To the residual mixture were charged 1137 g (7.73 moles) p-dichlorobenzene and 500 ml (513 g) N-methyl-2-pyrrolidone. The resulting mixture was heated for 3 hours at 510° F (266° C) at a maximum pressure of 170 psig. The reaction product was cooled, washed four times with water, and dried in a vacuum oven to obtain 658.6 g poly(p-phenylene sulfide) having a melt flow of 384 and an inherent viscosity of 0.25.

EXAMPLE II

In a run conducted in accordance with the process of this invention, with dehydration of charged ingredients in two separate steps, poly(p-phenylene sulfide) was produced with use of water in free form and as water of hydration in amounts equal to those used in Example I. Thus, 765 g (7.50 moles) lithium acetate dihydrate and 3,000 ml (3078 g) N-methyl-2-pyrrolidone were charged to the stirred 2-gallon reactor employed in Example I, and the reactor was flushed with nitrogen. The mixture was then dehydrated by supplying heat, throughout this dehydration step from the same two heaters provided with the same amperes of current obtained by use of the same voltage regulators set at the same constant values and connected to the same voltage sources as were used in Example I. By thus heating, distillation was conducted until the pot temperature reached 400° F (204° C), with the occurrence of no foaming or flooding in the column, yielding 290 ml of distillate comprising primarily water. The reactor was then cooled to 200° F (93° C), while purging with nitrogen, after which 983.7 g (60 percent assay, 7.56 moles) sodium sulfide, 46.8 g (1.17 moles) sodium hydroxide, and 384.9 g deionized water were added. The reactor was then flushed with nitrogen, and a second dehydration step was carried out. This second dehydration was conducted by supplying heat, throughout the dehydration step, from the same two heaters provided with the same amperes of current obtained by use of the same voltage regulators set at the same values and connected to the same voltage sources as were used in Example I. When the pot temperature reached 270° F (132° C), water cooling was employed to control some minor flooding in the distillation column. However, the flooding was over when the pot temperature reached 300° F (149° C), at which time water cooling was discontinued. At this point, the distillate, comprising primarily water, had a volume of 100 ml. The flooding which occurred during this second distillation step was very minor compared to that observed in the distillation step employed in Example I. The dehydration was continued, without any flooding or water cooling, until the pot temperature reached 408° F (209° C) and the distillation temperature reached 183° C. The total distillate, comprising primarily water, had a volume of 735 ml. To the residual mixture were charged 1137 g (7.73 moles) p-dichlorobenzene and 500 ml (513 g) N-methyl-2-pyrrolidone. The resulting mixture was heated for 3 hours at 510° F (266° C) at a maximum pressure of 170 psig. The reaction product was cooled, washed four times with water, and dried in a vacuum oven to obtain 668.5 g poly(p-phenylene sulfide) having a melt flow of 185 and an inherent viscosity of 0.31.

Thus, in this Example the extent of foaming and flooding in the distillation column was far less than that encountered in Example I. Furthermore, the molecular weight of the poly(p-phenylene sulfide) produced in this Example was considerably higher, based on melt flow and the inherent viscosity, than that produced in Example I.

EXAMPLE III

In a control run, with dehydration of charged ingredients in a single step, branched poly(phenylene sulfide) was produced in a process outside the scope of this invention, using water in free form and as water of hydration of sodium sulfide in a total amount approximately equal to that which would be used in a commercial operation employing aqueous sodium sulfide produced from commercially available aqueous sodium bisulfide and aqueous sodium hydroxide. Thus 983.7 g (60 percent assay, 7.56 moles) sodium sulfide, 46.8 g (1.17 moles) sodium hydroxide, 765 g (7.50 moles) lithium acetate dihydrate, 384.9 g deionized water, and 3,000 ml (3078 g) N-methyl-2-pyrrolidone were charged to a stirred 2-gallon reactor, which was then flushed with nitrogen. The mixture was then dehydrated by supplying heat, throughout the dehydration step, from two voltage regulated electric heaters connected to a 220 volt source. When the mixture attained a temperature of 273° F (134° C), refluxing began and it was necessary to use water cooling of the reactor to reduce foaming and flooding in the distillation column. The vigorous foaming and flooding was over when the pot temperature reached 285° F (141° C), at which time 275 ml of distillate had been obtained. At this point, water cooling was discontinued, and distillation was continued until the pot temperature reached 403° F (206° C) and the distillation temperature reached 183° C. The total distillate, comprising primarily water, had a volume of 1250 ml. To the residual mixture were charged 1137 g (7.73 moles) p-dichlorobenzene, 1.5 g (0.0083 mole) 1,2,4-trichlorobenzene, and 500 ml (513 g) N-methyl-2-pyrrolidone. The resulting mixture was heated for 3 hours at 510° F (266° C) at a maximum pressure of 170 psig. The reaction product was cooled, washed four times with water, and dried in a vacuum oven to obtain 613.3 g of branched poly(phenylene sulfide) having a melt flow of 572 and an inherent viscosity of 0.19.

EXAMPLE IV

In a run conducted in accordance with the process of this invention, with dehydration of charged ingredients in two separate steps, branched poly(phenylene sulfide) was produced with use of water in free form and as water of hydration in amounts equal to those used in Example III. Thus, 765 g (7.50 moles) lithium acetate dihydrate and 3000 ml (3078 g) N-methyl-2-pyrrolidone were charged to the stirred 2-gallon reactor employed in Example III, and the reactor was flushed with nitrogen. The mixture was then dehydrated by supplying heat, throughout this dehydration step from the same two heaters provided with the same amperes of current obtained by use of the same voltage regulators set at the same constant values and connected to the same voltage sources as were used in Example III. By thus heating, distillation was conducted until the pot temperature reached 400° F (204° C), with the occurrence of no foaming or flooding in the column, yielding 310 ml of distillate comprising primarily water. The reactor was then cooled to 200° F (93° C), while purging with nitrogen, after which 983.7 g (60 percent assay, 7.56 moles) sodium sulfide, 46.8 g (1.17 moles) sodium hydroxide, and 384.9 g deionized water were added. The reactor was then flushed with nitrogen, and a second dehydration step was carried out. This second dehydration was conducted by supplying heat, throughout the dehydration step, from the same two heaters provided with the same amperes of current obtained by use of the same voltage regulators set at the same values and connected to the same voltage sources as were used in Example III. The dehydration was conducted, without any flooding or water cooling, until the pot temperature reached 402° F (206° C) and the distillation temperature reached 183° C. The total distillate, comprising primarily water, had a volume of 950 ml. To the residual mixture were charged 1137 g (7.73 moles) p-dichlorobenzene, 1.5 g (0.0083 mole) 1,2,4-trichlorobenzene, and 500 mole (513 g) N-methyl-2-pyrrolidone. The resulting mixture was heated for 3 hours at 510° F (266° C) at a maximum pressure of 175 psig. The reaction product was cooled, washed four times with water, and dried in a vacuum oven to obtain 688.6 g branched poly(phenylene sulfide) having a melt flow of 148 and an inherent viscosity of 0.26.

Thus, in this Example, foaming and flooding did not occur in the distillation column whereas vigorous foaming and flooding occurred in the distillation column in Example III. Furthermore, the molecular weight of the branched poly(phenylene sulfide) produced in this Example was considerably higher, based on melt flow and inherent viscosity, than that produced in Example III.

I claim:
1. A method for producing polymers comprising:
   a. forming a first composition by contacting N-alkyl-2-pyrrolidone, lithium acetate and water;
   b. dehydrating said first composition to form a first dehydrated composition;
   c. contacting said first dehydrated composition with a second composition containing at least about 50 weight percent water and an alkali metal sulfide to form a third composition;
   d. dehydrating said third composition to form a third dehydrated composition; and
   e. contacting said third dehydrated composition with a p-dichlorobenzene at polymerization conditions for a period of time sufficient to form a p-phenylene sulfide polymer.

2. A method of claim 1 wherein said second composition also comprises a base selected from alkali metal hydroxides and alkali metal carbonates.

3. A method of claim 1 wherein said water in said first composition is in a form selected from among an aqueous solution of lithium acetate, an aqueous slurry of lithium acetate and lithium acetate dihydrate.

4. A method of claim 2 wherein said water in said first composition is in a form selected from among an aqueous solution of lithium acetate, an aqueous slurry of lithium acetate and lithium acetate dihydrate.

5. A method of claim 3 wherein said p-dihalobenzene is represented by the formula

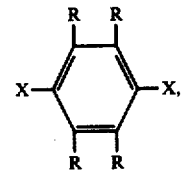

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

6. A method of claim 4 wherein said p-dihalobenzene is represented by the formula

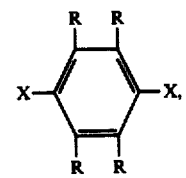

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

7. A method of claim 5 wherein the N-alkyl-2-pyrrolidone is represented by the formula

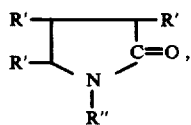

where each R' is selected from the group consisting of hydrogen and R", and R" is an alkyl radical having 1 to about 3 carbon atoms, the total number of carbon atoms in each molecule of the N-alkyl-2-pyrrolidone being 5 to about 8.

8. A method of claim 6 wherein the N-alkyl-2-pyrrolidone is represented by the formula

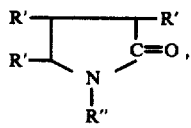

where each R' is selected from the group consisting of hydrogen and R", and R" is an alkyl radical having 1 to about 3 carbon atoms, the total number of carbon atoms in each molecule of the N-alkyl-2-pyrrolidone being 5 to about 8.

9. A method of claim 7 wherein the mole ratio of p-dihalobenzene to alkali metal sulfide is within the range of about 0.9:1 to about 2:1 and the mole ratio of lithium acetate to alkali metal sulfide is within the range of about 0.7:1 to about 4:1.

10. A method of claim 8 wherein the mole ratio of p-dihalobenzene to alkali metal sulfide is within the range of about 0.9:1 to about 2:1, the mole ratio of lithium acetate to alkali metal sulfide is within the range of about 0.7:1 to about 4:1; the mole ratio of base to alkali metal sulfide is within the range of about 0.01:1 to about 0.8:1.

11. A method of claim 9 wherein polymerization conditions comprise a reaction temperature within the range of about 125° C to about 450° C, a pressure sufficient to maintain the p-dihalobenzene and organic amide substantially in the liquid phase, and the reaction time is within the range of about 10 minutes to about 72 hours.

12. A method of claim 10 wherein polymerization conditions comprise a reaction temperature within the range of about 125° C to about 450° C, a pressure sufficient to maintain the p-dihalobenzene and organic amide substantially in the liquid phase, and the reaction time is within the range of about 10 minutes to about 72 hours.

13. A method of claim 12 wherein the N-alkyl-2-pyrrolidone is N-methyl-2-pyrrolidone, the water in the first composition is contained in lithium acetate dihydrate, the base is sodium hydroxide, the alkali metal sulfide is sodium sulfide, said p-dihalobenzene is p-dichlorobenzene, the reaction temperature is within the range of about 175° C to about 350° C and the reaction time is within the range of about 1 hour to about 8 hours.

14. A method of claim 1 wherein said third dehydrated composition is contacted with a polyhalo aromatic compound having more than two halogen substituents per molecule and a p-dihalobenzene at polymerization conditions for a period of time sufficient to form a branched arylene sulfide polymer.

15. A method of claim 14 wherein said second composition also comprises a base selected from alkali metal hydroxides and alkali metal carbonates.

16. A method of claim 14 wherein said water in said first composition is in a form selected from among an aqueous solution of lithium acetate, an aqueous slurry of lithium acetate and lithium acetate dihydrate.

17. A method of claim 15 wherein said water in said first composition is in a form selected from among an aqueous solution in lithium acetate, an aqueous slurry of lithium acetate and lithium acetate dihydrate.

18. A method of claim 16 wherein said p-dihalobenzene is represented by the formula

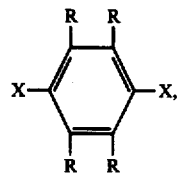

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen and said polyhalo aromatic compounds having more than two halogen substituents per molecule are represented by the formula R'''X$_n$, where each X is selected from the group consisting of chlorine, bromine, and iodine, n is an integer of 3 to 6, and R''' is a polyvalent aromatic radical of valence n which can have up to about 4 methyl substituents, the total number of carbon atoms in R''' being within the range of 6 to about 16.

19. A method of claim 17 wherein said p-dihalobenzene is represented by the formula

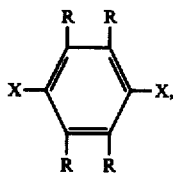

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen and said polyhalo aromatic compounds having more than two halogen substituents per molecule are represented by the formula R'''X$_n$, where each X is selected from the group consisting of chlorine, bromine, and iodine, n is an integer of 3 to 6, and R''' is a polyvalent aromatic radical of valence n which can have up to about 4 methyl substituents, the total number of carbon atoms in R''' being within the range of 6 to about 16.

20. A method of claim 18 wherein the N-alkyl-2-pyrrolidone is represented by the formula

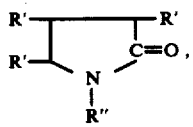

where each R' is selected from the group consisting of hydrogen and R'', and R'' is an alkyl radical having 1 to about 3 carbon atoms, the total number of carbon atoms in each molecule of the N-alkyl-2-pyrrolidone being 5 to about 8.

21. A method of claim 19 wherein the N-alkyl-2-pyrrolidone is represented by the formula

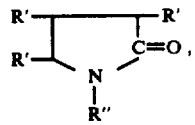

where each R' is selected from the group consisting of hydrogen and R'', and R'' is an alkyl radical having 1 to about 3 carbon atoms, the total number of carbon atoms in each molecule of the N-alkyl-2-pyrrolidone being 5 to about 8.

22. A method of claim 18 wherein the mole ratio of p-dihalobenzene to alkali metal sulfide is within the range of about 0.9:1 to about 2:1, the mole ratio of lithium acetate to alkali metal sulfide is within the range of about 0.7:1 to about 4:1 and the polyhalo aromatic compound having more than two halogen substituents per molecule is present in an amount up to about 0.6 part by weight per 100 parts by weight of p-dihalobenzene.

23. A method of claim 21 wherein the mole ratio of p-dihalobenzene to alkali metal sulfide is within the range of about 0.9:1 to about 2:1, the mole ratio of lithium acetate to alkali metal sulfide is within the range of about 0.7:1 to about 4:1; the mole ratio of base to alkali metal sulfide is within the range of about 0.01:1 to about 0.8:1 and the polyhalo aromatic compound having more than two halogen substituents per molecule is present in an amount up to about 0.6 part by weight per 100 parts by weight of p-dihalobenzene.

24. A method of claim 22 wherein polymerization conditions comprise a reaction temperature within the range of about 125° C to about 450° C, a pressure sufficient to maintain the p-dihalobenzene, the polyhalo aromatic compound having more than two halogen substituents per molecule, and organic amide substantially in the liquid phase, and the reaction time is within the range of about 10 minutes to about 72 hours.

25. A method of claim 23 wherein polymerization conditions comprise a reaction temperature within the range of about 125° C to about 450° C, a pressure sufficient to maintain the p-dihalobenzene, the polyhalo aromatic compound having more than two halogen substituents per molecule, and organic amide substantially in the liquid phase, and the reaction time is within the range of about 10 minutes to about 72 hours.

26. A method of claim 25 wherein the N-alkyl-2-pyrrolidone is N-methyl-2-pyrrolidone, the water in the first composition is contained in lithium acetate dihydrate, the base is sodium hydroxide, the alkali metal sulfide is sodium sulfide, the p-dihalobenzene is p-dichlorobenzene, the polyhalo aromatic compound having more than two halogen substituents per molecule is 1,2,4-trichlorobenzene, the reaction is within the range of about 175° C to about 350° C and the reaction time is within the range of about 1 hour to about 8 hours.

* * * * *

UNITED STATES PATENT AND TRADEMARK OFFICE
CERTIFICATE OF CORRECTION

PATENT NO. : 4,064,114
DATED : December 20, 1977
INVENTOR(S) : James T. Edmonds, Jr.

It is certified that error appears in the above-identified patent and that said Letters Patent are hereby corrected as shown below:

Column 8, line 16, "p-dichlorobenzene" should be

--- p-dihalobenzene ---.

Column 12, line 34, after "reaction" insert

--- temperature ---.

Signed and Sealed this

Sixteenth Day of May 1978

[SEAL]

Attest:

RUTH C. MASON
Attesting Officer

LUTRELLE F. PARKER
Acting Commissioner of Patents and Trademarks